United States Patent
Kyperountas et al.

(10) Patent No.: US 7,277,401 B2
(45) Date of Patent: Oct. 2, 2007

(54) REDUCED ORDER MODEL NODE LOCATION METHOD FOR MULTI-HOP NETWORKS

(75) Inventors: Spyros Kyperountas, Boca Raton, FL (US); Feng Niu, Weston, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 1000 days.

(21) Appl. No.: 10/424,178

(22) Filed: Apr. 25, 2003

(65) Prior Publication Data

US 2004/0213190 A1 Oct. 28, 2004

(51) Int. Cl.
*H04L 12/28* (2006.01)
*H04Q 7/24* (2006.01)

(52) U.S. Cl. ..................... 370/255; 370/338
(58) Field of Classification Search ............ None
See application file for complete search history.

(56) References Cited

U.S. PATENT DOCUMENTS 6,473,038 B2  10/2002  Patwari et al.
7,158,078 B2 *  1/2007  Ninomiya et al. ..... 342/357.01
2005/0233748 A1 * 10/2005  Robinson et al. ........... 455/440

OTHER PUBLICATIONS

Albowicz, J. et al.: "Recursive Position Estimation in Sensor Networks", UCLA Internet Research Laboratory, 2001, seven pages.
Koushanfar, F.: "Iterative Error-Tolerent Location Discovery in Ad-hoc Wireless Sensor Networks", University of California, 2001, 101 pages.

* cited by examiner

*Primary Examiner*—Huy D. Vu
*Assistant Examiner*—Nittaya Juntima

(57) ABSTRACT

A method for locating nodes in a multi-hop sensor network forms a rigid body (RB1, RB2, RB3) and, from the nodes, utilizes the rigid body to decide if a node is locatable. The method obtains a reduced order model (ROM) of the network by categorizing all of the nodes by location status, grouping them based upon the categorizations, and defining and identifying a rigid body from a group. The method further simplifies determinability of node location by forming the rigid body from the nodes based upon the categorized location status. To locate the nodes, the nodes are separated from one another into subsets dependent upon characteristics (100). Then, groups are formed from one subset (200) and the rigid body is formed from a group (300). The ROM is formed from the rigid body (400) and a location capability of the rigid body is evaluated based upon the ROM (500).

17 Claims, 3 Drawing Sheets

REDUCED ORDER MODEL NODE LOCATION METHOD FOR MULTI-HOP NETWORKS

BACKGROUND OF THE INVENTION

1. Field of the Invention

The invention lies in the field of electronic communications. The invention relates to a reduced order model location method for multi-hop networks.

2. Description of the Related Art

In a multi-hop sensor network, because of limited transmitted power, a communications node can only communicate with a small subset of the other communications nodes in the entire network. A traditional location system may not work for a multi-hop network because the multi-hop network requires that any node be linked directly to three reference nodes with known locations that are not on a line in a two-dimensional space or to four reference nodes with known locations that are not on a plane in a three-dimensional space. The consequence of such failure is that many nodes will not be able to locate, especially when the sensor network is sparse.

An iterative or successive procedure is used to change a node to an induced reference node if the node can be located using the traditional approach. Thus, induced reference nodes are nodes that initially do not know their coordinates but, because they have the range measurements from a sufficient number of nodes with known coordinates, they can solve a simple triangulation problem and discover their own coordinates. See "Recursive Position Estimation in Sensor Networks," Joe Albowicz, Alvin Chen, and Lixia Zhang, UCLA Research Laboratory, 2001. However, after such a procedure, there will still be a subset of the nodes that is not located, especially in a sparse sensor environment. Moreover, existing methods that decide if a node is locatable or not do so by establishing the number of independent paths of each node to reference nodes, which becomes highly computationally intense for large networks. This method can also be shown to result in erroneous decisions as far as position solutions are concerned.

SUMMARY OF THE INVENTION

The invention provides a reduced order model location method for multi-hop networks that overcomes the hereinafore-mentioned disadvantages of the heretofore-known devices and methods of this general type and that provides new location measures using the rigid body concept to reduce the degree of the freedom in the system and arrive at a reduced order model and applies a procedure to obtain the reduced order model with innovations including a coloring scheme for initial categorization of nodes, a method to group the nodes, a new independent path procedure, and defining and identifying rigid body(ies) with joint node(s).

With the foregoing and other objects in view, in accordance with the invention, a method for locating nodes in a multi-hop sensor network forms a rigid body from the nodes utilizes the rigid body to decide if a node is locatable. The method obtains a reduced order model of the network by categorizing all of the nodes by location status, grouping them based upon the categorizations, and defining and identifying a rigid body from a group. The method further simplifies determinability of node location by forming the rigid body from the nodes based upon the categorized location status. To locate the nodes, the nodes are separated from one another into subsets dependent upon characteristics. Then, groups are formed from one subset and the rigid body is formed from a group. The ROM is formed from the rigid body and a location capability of the rigid body is evaluated based upon the ROM. As it is used herein, the phrase "rigid body" means that the spatial or geometrical relationships between a set of nodes are fixed by the given peer-to-peer distances among them. In other words, these nodes form a geometrically rigid or non-deformable "shape" due to the given distances between them.

The present invention overcomes the problems associated with the prior art by an innovation in categorizing the location status of all nodes in a multi-hop network. Such innovation includes the formation of rigid bodies from these nodes and, thus, simplifies the problem of locating the nodes that cannot be located (nodes without enough of a number of direct links to the reference nodes) through the traditional methods. The present invention is a reduced order modeling of the distributed sensor network, which modeling decides whether each node is locatable or not, the order of location for minimum propagation error throughout the network, and the algorithms that should be employed to achieve best location.

The location system is based on the reduction of the network search space within every step leading to solid structures in space, in other words, the rigid bodies. This not only allows for an efficient algorithm for location estimation but also provides a global perspective of the network's ability to locate (in parts or as a whole) with all the inherit advantages. This will enable the resolution of optimum location strategies for any sensor node deployment.

Other features that are considered as characteristic for the invention are set forth in the appended claims.

Although the invention is illustrated and described herein as embodied in a reduced order model location method for multi-hop networks, it is, nevertheless, not intended to be limited to the details shown because various modifications and structural changes may be made therein without departing from the spirit of the invention and within the scope and range of equivalents of the claims.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DESCRIPTION OF THE PREFERRED EMBODIMENTS

Figure 1:
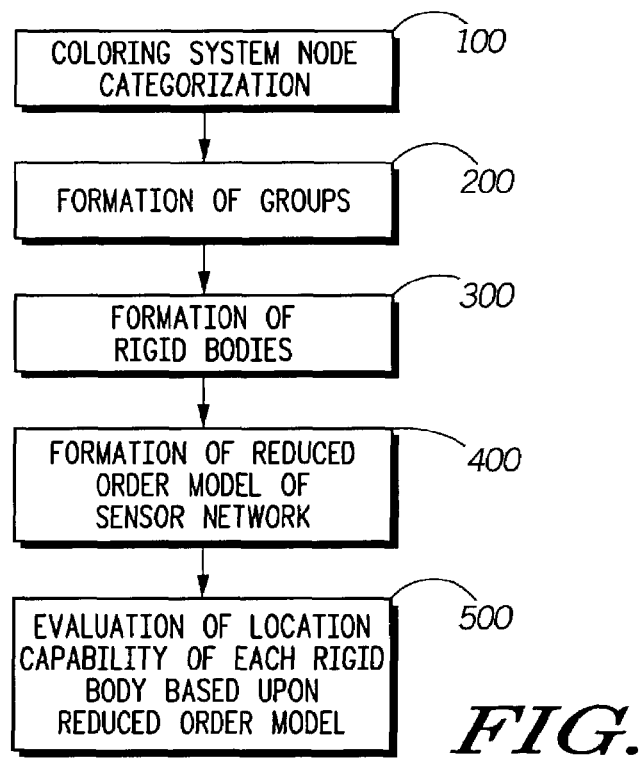
FIG. 1 is a flow chart of the method according to the invention.

While the specification concludes with claims defining the features of the invention that are regarded as novel, it is believed that the invention will be better understood from a consideration of the following description in conjunction with the drawing figures, in which like reference numerals are carried forward.

The present invention forms rigid bodies from the nodes of a distributed sensor network utilizing a Reduced Order Modeling (ROM) of the network. To carry out the modeling, decisions on the locatability of each node, on the order of location for minimum propagation error throughout the network, and on the algorithms that should be employed to achieve best location are made.

To more efficiently locate nodes in a distributed sensor network, an efficient algorithm is needed for location discovery. To arrive at a decreased space, subsets of nodes can be defined so long as the subsets have a sufficient degree of confidence for locating at least a few of the nodes in each subset. If these subsets, also referred to herein as rigid bodies, can be located only upon an even smaller subset of nodes contained therewithin, then location efficiency increases. By defining rigid bodies made up of a plurality of nodes according to a particular system, it is possible to locate every node forming the rigid body if only three of the rigid body's nodes are locatable. Therefore, the location system of the present invention is based on a reduction of the network search space within every step leading to the rigid bodies, in other words, solid structures in space.

Therefore, the system of the present invention is directed towards finding and identifying the rigid body(ies) within the distributed sensor network. According to the present invention, a unique location of each node is ascertained, in other words, there is an inquiry and a determination as to the ability of a node to be locatable or not locatable. Efficiency increases if the process only spends time on attempting to locate the nodes determined to be locatable and eliminating, as early as possible, the non-locatable nodes from further investigation.

The system described below relates to a two-dimensional scenario. However, the same principles apply for a three-dimensional setting. The location system can be described by a five-step procedure set forth in general in FIG. 1 and with greater detail in the following text.

Initially, it is assumed that the peer-to-peer ranging information of each sensor (i.e., node) throughout the network is available.

Step 100: Coloring System Node Categorization

Nodes are separated from one another into different groups dependent upon particular characteristics. These groups are, herein, given color descriptions including green, red, and blue.

Green nodes are those nodes that are linked to at least three other green nodes and/or reference nodes not on the same geometric line. Green nodes are the nodes (induced reference nodes) that can be progressively located from reference nodes and have one positioning solution. They are the most "trusted" nodes in the network and should be located first.

Red nodes are those nodes that are linked to only one or two other nodes not including the red nodes. Red nodes are, specifically, the nodes having more than one solution to their respective location and should be treated accordingly.

Finally, the remaining nodes are defined as blue nodes. Blue nodes are those nodes for which there is still an uncertainty as to whether or not they can be located in this Step 100.

Step 200: Formation of Groups to Include All Blue Nodes

Figure 2:
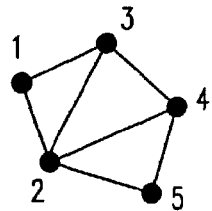
FIG. 2 is a diagrammatic illustration of a group of nodes according to the invention.

A group forming process starts with a blue node and its neighboring blue or green node (preferably, blue). These two nodes, together, form a seed pair for a given group. To grow the group, the following rule is used: any blue or green node connecting to two nodes within the group becomes part of the group. The process ends when all the nodes that can be added to this given group are added. Once the process ends, the given group is formed. This process is repeated until all possible groups are formed in the network Step 200 is illustrated by the example shown in FIG. 2. The initial node pair is formed with nodes 1 and 2. Then, because node 3 has two links to the initial node pair, node 3 joins the group. Nodes 4 and 5 are joined to the group in a similar manner. A new group forming process starts with a blue node that is not included in any one of the previously defined groups. The process described above is repeated and continues until no blue nodes are left.

The groups are further trimmed down to define:
- edge nodes (EN)—nodes that are linked to only two nodes in a given group;
- a non-trivial group core (NTGC)—groups having more than three nodes after removing the edge nodes; and
- trivial groups—triangles and linked node pairs.

The resulting groups are either rigid or a collection of rigid bodies.

Step 300: Formation of Rigid Bodies

This is a two-step process that initiates in each NTGC as follows:

a) Starting with a triangle (also referred to as an initial core or basic rigid body) within a NTGC, a node is added to the initial core if the node is linked (through a single communications hop) to at least three nodes in the progressively forming core. Such progressive linking results in the definition of a rigid body core (RBC). The first part of this two-step process enrolls most of the nodes that are part of the rigid body.

Figure 3:
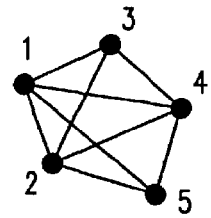
FIG. 3 is a diagrammatic illustration of a rigid body core of nodes according to the invention.

An example of this sub-step a) is illustrated with regard to FIG. 3. Specifically, an initial triangle is formed with nodes 1, 2, and 3. Node 4 joins the RBC because it has 3 links to the initial core, specifically, it has a one-hop link to each of nodes 1, 2, and 3. Finally, node 5 joins the RBC because it has 3 links thereto, specifically, it has a one-hop link to each of nodes 1, 2, and 4.

b) An RBC in a group is expanded to form a rigid body. The rigid body is formed by including a node having three independent paths to three nodes already in the RBC. The rigid body is further expanded by examining each node connected by one hop to the rigid body and including all nodes examined to have three independent paths to three nodes already in the rigid body.

Figure 4:
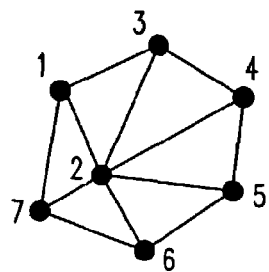
FIG. 4 is a diagrammatic illustration of a rigid body of nodes according to the invention.

FIG. 4 illustrates a rigid body formed by the process of this sub-step b). As before, the initial triangle is formed with nodes 1, 2, and 3. Clearly, no other node has three links to the initial triangle, but, node 4 can join the initial core triangle because there are three independent paths from node 4 to the different nodes of the initial triangle; specifically, there is a direct link between node 4 and node 3, there is a direct link between node 4 and node 2, and there is an independent (albeit indirect) link from node 4 to node 1 through nodes 5, 6, and 7. In a similar way, nodes 6 and 7 can join the rigid body formed by nodes 1 through 4.

If three nodes in an RBC also belong to another RBC, the two RBCs are merged into one rigid body. These rigid bodies continue to expand until all nodes are absorbed and all RBCs are either absorbed into rigid bodies or become rigid bodies themselves. By the end of this Step 300, every blue node is either part of a rigid body in a group or is defined as an edge node.

Figure 5:
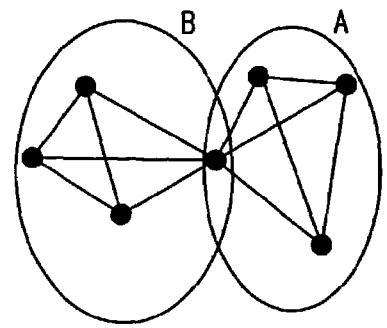
FIG. 5 is a diagrammatic illustration of two rigid bodies connected by a single node.

The independent paths are defined as paths with no common nodes rather than no common edges (the traditional way). Such a definition will avoid decisions such as a rigid body A and a rigid body B forming a bigger rigid body when, in fact, they do not. Such a condition is illustrated, for example, in FIG. 5.

Step 400: Formation of the Reduced Order Model of the Sensor Network

Now, all of the blue nodes in the network are assigned as being either a part of a rigid body or as an edge node. Based upon the characteristics of rigid bodies as defined herein, the entirety of each rigid body can be located if only three of its member nodes not in a geometric line are located. From this, the previously complex problem of locating each and every one of the blue nodes is simplified into two much simpler problems:

a) locating only the rigid bodies (much less degrees of freedom, i.e., need only to locate three points on the rigid body per rigid body) and the edge nodes; and b) locating the member nodes within each rigid body once the rigid body is located (a determination that can be made by locating three of its member nodes not in a geometric line).

Step 500: Evaluation of Location Capability of Each Rigid Body Based Upon the Reduced Order Model An example of simple rules for deciding whether a body is locatable in two dimensions include:

a) If a rigid body has three or more reference and/or induced reference nodes, every node on that rigid body is located;

b) If a rigid body has two reference/induced reference nodes and at least one other node (not in one geometric line with the two reference/induced reference nodes) linked to at least one reference/induced reference node, every node on the rigid body is located;

c) If a rigid body has one reference/induced reference node or an edge node that is a reference/induced reference node and also has at least two other nodes (not in one geometric line) linked to at least two other reference/induced reference nodes, every node on the rigid body is located;

d) If a rigid body has no reference/induced reference nodes but at least three other nodes (not in one geometric line) linked to at least three reference/induced reference nodes, one of which having at least two links to the rigid body, every node on the rigid body is located; and e) If a rigid body is located, any edge node of that rigid body is also located if the particular edge node is linked to a reference/induced reference node or another located rigid body.

Traditional methods define a node to be locatable if it has three independent paths to reference nodes. These methods disregard the global picture of the network and often result to erroneous decisions with respect to positioning. Simply put, rotating a dot on a map results in no change until one observes that the dot is part of a bigger body and the rotation will affect a positioning of the total system of which the dot is one part.

Figure 6:
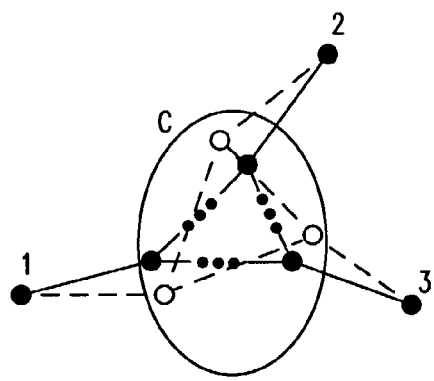
FIG. 6 is a diagrammatic illustration of a group of nodes that cannot be identified as locatable according to the prior art and can be identified as locatable according to the invention.
Figure 7:
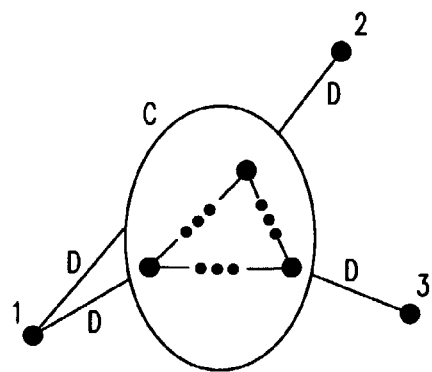
FIG. 7 is a diagrammatic illustration of a group of nodes not locatable according to the prior art and locatable according to the invention.

To illustrate this point, the following example is explained with regard to FIG. 6. Using the traditional node rule, the nodes within rigid body C will all be determined as locatable because all have independent paths to reference nodes 1, 2, 3. However, they are not locatable. Actually, the three nodes within rigid body C have two discrete positioning solutions. The first solution is illustrated with black nodes and the second solution is illustrated with white nodes—one of these sets of nodes being a rotated version of the other of these sets of nodes. Through the rigid body Reduced Order Model of the present invention and rule d) in Step 500 above, such a situation is identified in addition to the solution for successful positioning because, shown in FIG. 7, at least three other nodes 1, 2, 3 (not in one geometric line) are linked D to at least three reference/induced reference nodes (the three nodes within rigid body C), one of the other nodes (node 1) having at least two links D to the rigid body.

The following text sets forth an example multi-hop sensor network and applies the algorithm of the present invention to the network. As will be shown, the algorithm easily identifies the rigid bodies and distinguishes locatable rigid bodies from non-locatable rigid bodies.

Figure 8:
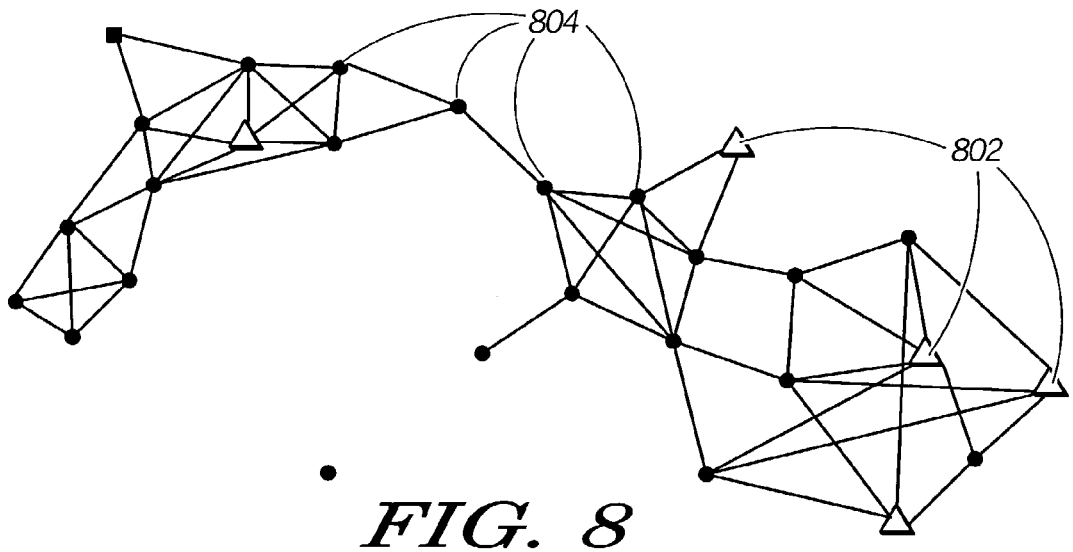
FIG. 8 is a diagrammatic illustration of an exemplary initial deployment of nodes to be located.

In the example simulation illustrated first in FIG. 8, a sample rectangular observation space is selected (the shape is chosen merely for illustration purposes). Nodes are randomly positioned in the space of FIG. 8 (twenty-eight in the example), five of the nodes being reference nodes 802 (indicated with triangles) and the remaining nodes 804 to be evaluated for location capability (indicated with circles). It is assumed, in this example, that each node has an average communication distance that extends approximately one-fifth of the total horizontal distance and approximately one-fifth of the total vertical distance. Thus, lines between two nodes respectively indicate that the two nodes connected by the line are within each other's communications range.

Figure 9:
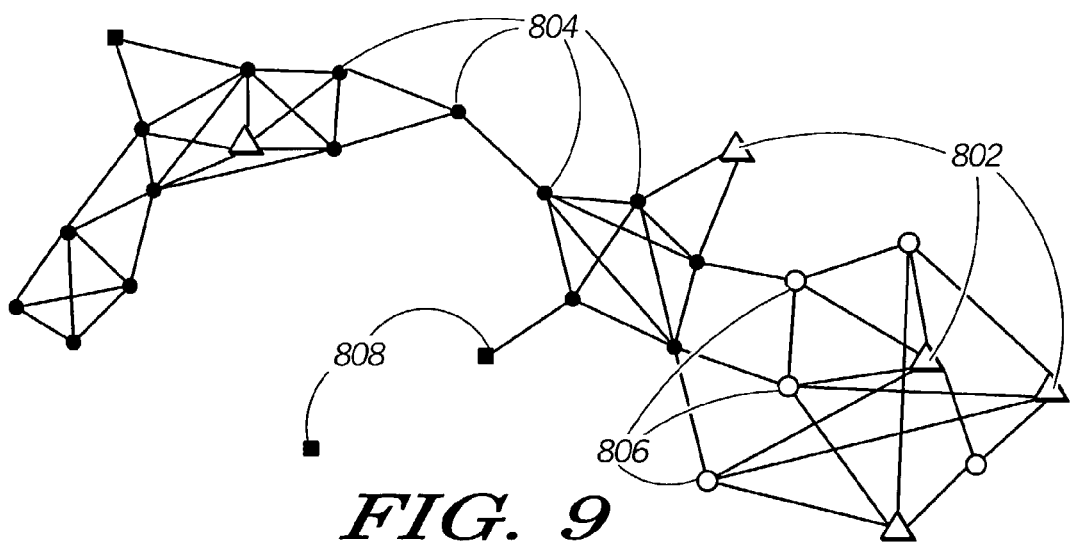
FIG. 9 is a diagrammatic illustration of a first association of the nodes of FIG. 8 after an execution step according to the invention.

FIG. 9 illustrates the results after executing Step 100. Specifically, each node that is linked to at least three other green nodes or reference nodes 802 is deemed to be a green node. The red nodes 808, also referred to as lost nodes, are defined as those nodes that are linked to only one or two other nodes not including other red nodes. Remaining nodes are each defined as a blue node. In FIG. 9, the larger dots (green) illustrate the induced reference nodes 806 and the squares (red) illustrate the nodes 808 that are lost or have either two discrete or circle path solutions with respect to their neighboring nodes.

Figure 10:
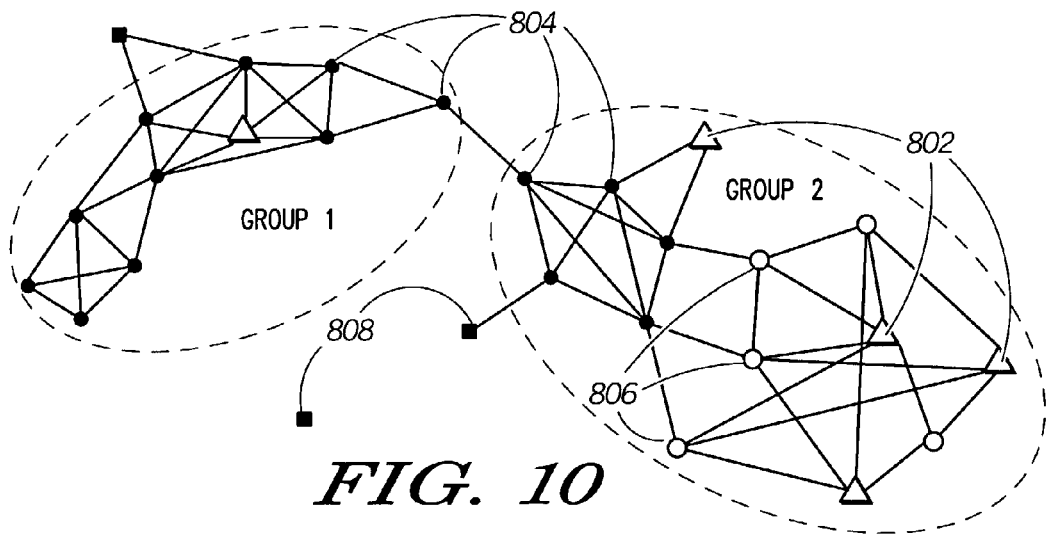
FIG. 10 is a diagrammatic illustration of a second association of the nodes of FIG. 8 after another execution step according to the invention.

FIG. 10 illustrates the results after executing Step 200. Specifically, seed pairs are formed by a respective blue node and its neighboring blue or green node. Then, the groups are grown by adding to a respective group any blue or green node connecting to two nodes within the respective group. The result of Step 200 splits the network into two groups.

Figure 11:
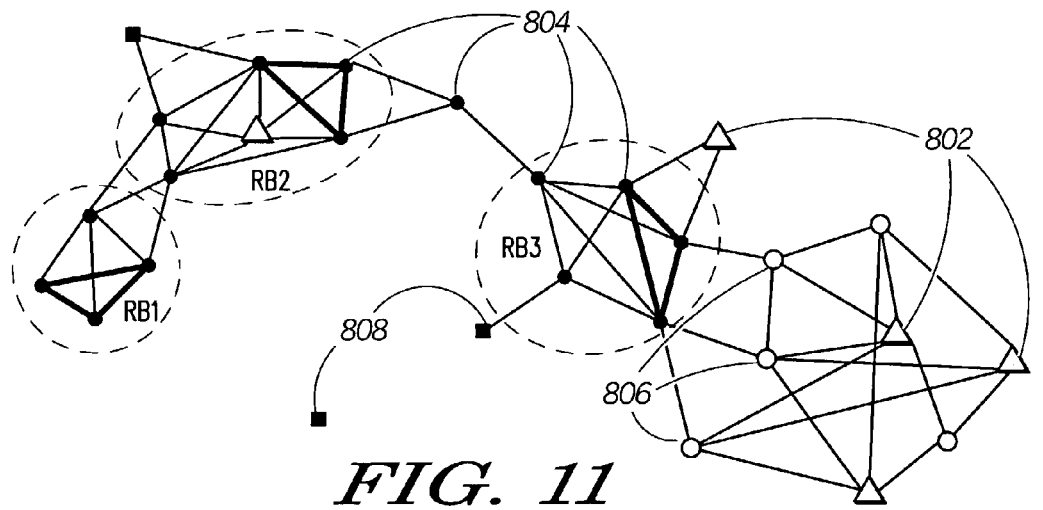
FIG. 11 is a diagrammatic illustration of a third association of the nodes of FIG. 8 after a further execution step according to the invention.

FIG. 11 illustrates the result of performing Step 300. Initial cores of three nodes are found. In the example, three initial cores are selected and are indicated with heavy lines. Starting with these initial cores, nodes are added to each. After adding all possible nodes pursuant to Step 300, three initial cores result in three rigid bodies RB1, RB2, RB3.

Figure 12:
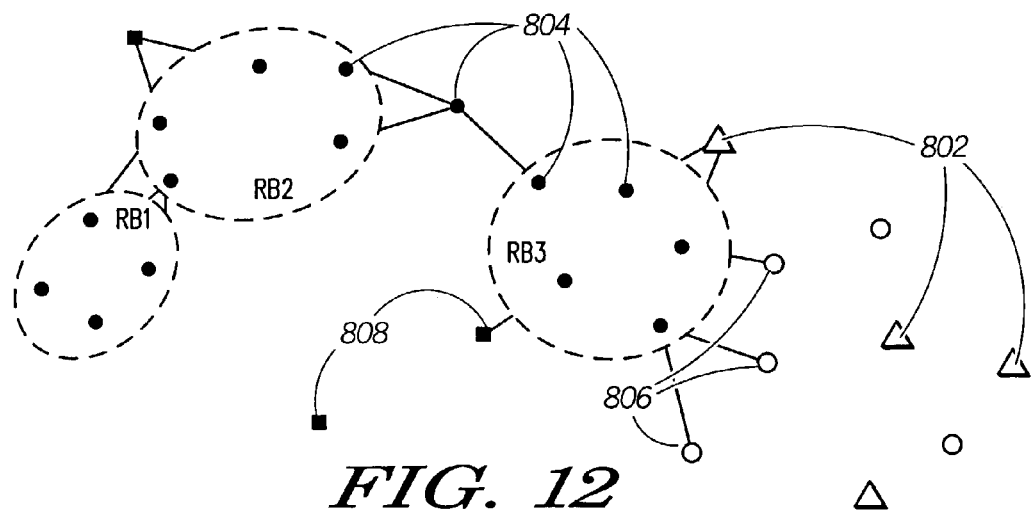
FIG. 12 is a diagrammatic illustration of a final association of the nodes of FIG. 8 after execution of the steps according to the invention.

FIG. 12 portrays the final Reduced Order Model resulting from Step 400. Simply put, FIG. 12 shows the resulting rigid bodies (RB1, RB2, RB3) and their connection (i.e., solid lines) to any outside network elements (other rigid bodies and nodes).

Then, the rules of Step 500 are applied to decide on the possibility of location of the rigid bodies. In essence, for location error minimization, each identified rigid body that can be located is individually positioned on a respective local coordinate system (because they are very stable structures as far as the ranging error is concerned) without considering any nodes outside that rigid body.

Such effort positions the rigid body's coordinate system within the global coordinate system (in other words, the coordinate system of the green nodes). From FIG. 12 and the rules of Step 500, the system of the present invention easily identifies that RB3 is locatable (because it satisfies rule d)) but RB1 and RB2 are not (because RB1 does not satisfy rule d) or any other rule and RB2 does not satisfy rule c) or any other rule).

Nonetheless, local positioning information can be extracted for RB1 and RB2 if some positioning information is of value (for example, even though RB1 and RB2 are not uniquely located, they may have a specific set of identifiable locations in which they may reside).

The system according to the present invention can be applied to any distributed sensor network with ranging capabilities. Similar steps (i.e., coloring and different levels of grouping) and analogous locatability rules (somewhat similar to those in Step 500) can be used for rigid body discovery in three-dimensional networks.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

We claim:

1. A method for locating nodes in a multi-hop sensor network, which comprises:
   providing the nodes with:
      unlocated nodes; and
      reference nodes each having a defined location;
   separating the nodes from one another into different subsets dependent upon given characteristics by categorizing the nodes into three different groups dependent upon respective given characteristics by the steps of:
      a first of the three groups having all nodes linked to at least three other nodes not on a same geometric line selected from the group consisting of:
         the reference nodes; and
         nodes of the first group;
      a second of the three groups having all nodes linked to at most two other ones of the unlocated nodes or the references nodes not including other nodes of the second group; and
      a third of the three groups having all remaining nodes not in the first or second groups;
   defining links between the nodes;
   forming groups from the nodes of one subset;
   forming at least one rigid body from at least one of the groups;
   forming a reduced order model of the network with the at least one rigid body; and
   evaluating a location capability of the at least one rigid body based upon the reduced order model.

2. The method according to claim 1, which further comprises providing the nodes of the first group with induced reference nodes progressively located from the reference nodes and having one positioning solution.

3. The method according to claim 1, which further comprises providing the nodes of the second group with the nodes having more than one solution to a respective location thereof.

4. The method according to claim 1, which further comprises carrying out the group formation step by:
   forming a seed pair for a given group starting with a starting node from the third group and another node from the first or third groups neighboring the starting node;
   growing the given group by joining to the given group any node from one of the first and thirds groups connecting to two nodes already within the given group; and
   repeating the forming and growing steps until all possible groups are formed in the network.

5. The method according to claim 4, which further comprises defining edge nodes as all nodes linked to only two other nodes in a group.

6. The method according to claim 5, which further comprises defining a non-trivial group core for each group having more than three nodes after removing the edge nodes from the respective group.

7. The method according to claim 6, which further comprises carrying out the rigid body forming step by:
   defining an initial core of each non-trivial group core;
   examining each node in a group to determine if the node is linked through a single communications hop to at least three other nodes in the initial core and, if the node is so linked, then adding the node to the initial core to form a progressively forming initial core; and
   defining a rigid body core from the progressively forming initial core after all nodes in the group are examined.

8. The method according to claim 7, which further comprises carrying out the rigid body forming step by:
   examining each node in the group outside the rigid body core to identify nodes in the group having three independent paths to three nodes already in the rigid body core;
   adding to the rigid body core each examined node in the group having three independent paths to three nodes already in the rigid body core; and
   forming a rigid body from the rigid body core.

9. The method according to claim 8, which further comprises carrying out the rigid body forming step by:
   examining each node connected by one hop to the rigid body to identify nodes having three independent paths to three nodes already in the rigid body; and
   further expanding the rigid body by adding to the rigid body each examined node connected by one hop to the rigid body and having three independent paths to three nodes already in the rigid body.

10. The method according to claim 9, which further comprises carrying out the rigid body forming step by determining if three nodes in one rigid body also belong to another rigid body and, if so, merging the two rigid bodies into one rigid body.

11. The method according to claim 10, which further comprises locating an entirety of each rigid body if only three member nodes not in a geometric line are located.

12. The method according to claim 10, which further comprises locating every node on a rigid body if the rigid body has at least three of any of reference nodes and induced reference nodes.

13. The method according to claim 10, which further comprises locating every node on a rigid body if the rigid body has:
- two of any of reference nodes and induced reference nodes; and
- at least one other node not in one geometric line with the two nodes and linked to at least one of a reference node or an induced reference node.

14. The method according to claim 10, which further comprises locating every node on a rigid body if the rigid body has one of any of reference nodes and induced reference nodes or an edge node that is a reference node or an induced reference node and also has at least two other nodes not in one geometric line linked to at least two other reference nodes or induced reference nodes.

15. The method according to claim 10, which further comprises locating every node on a rigid body if the rigid body has no reference nodes or induced reference nodes but has at least three other nodes not in one geometric line linked to at least three reference nodes or induced reference nodes, one of the at least three reference nodes or induced reference nodes having at least two links to the rigid body.

16. The method according to claim 10, which further comprises, if the rigid body is located, also locating a particular edge node of the rigid body if the particular edge node is linked to a reference node, an induced reference node, or another located rigid body.

17. The method according to claim 8, which further comprises defining an independent path as a path with no common nodes.

* * * * *

UNITED STATES PATENT AND TRADEMARK OFFICE
CERTIFICATE OF CORRECTION

| | | |
|---|---|---|
| PATENT NO. | : 7,277,401 B2 | Page 1 of 1 |
| APPLICATION NO. | : 10/424178 | |
| DATED | : October 2, 2007 | |
| INVENTOR(S) | : Spyros Kyperountas, Feng Niu and Qicai Shi | |

It is certified that error appears in the above-identified patent and that said Letters Patent is hereby corrected as shown below:

Col. 1, Line 5
In the specification, after the title and before the heading "FIELD OF THE INVENTION" the following paragraph should be inserted:

--STATEMENT REGARDING FEDERALLY
SPONSORED RESEARCH OR DEVELOPMENT

This invention was made with United States Government support under 70NANB2H3001 awarded by the National Institute of Standards and Technology (NIST). The United States Government has certain rights in the invention.--

Signed and Sealed this

Thirteenth Day of January, 2009

JON W. DUDAS
*Director of the United States Patent and Trademark Office*